US012567742B2

(12) United States Patent
Farrokhabadi et al.

(10) Patent No.: US 12,567,742 B2
(45) Date of Patent: Mar. 3, 2026

(54) SYSTEM AND METHODS FOR PHANTOM DIAGNOSTIC METERING OF ENERGY SYSTEMS

(71) Applicant: BluWave Inc., Ottawa (CA)

(72) Inventors: Mostafa Farrokhabadi, Ottawa (CA); Francois Odouard, Larchmont, NY (US); Devashish Paul, Ottawa (CA); Behnam Tamimi, Waterloo (CA)

(73) Assignee: BluWave Inc., Ottawa (CA)

( * ) Notice: Subject to any disclaimer, the term of this patent is extended or adjusted under 35 U.S.C. 154(b) by 579 days.

(21) Appl. No.: 17/994,192

(22) Filed: Nov. 25, 2022

(65) Prior Publication Data

US 2023/0163591 A1     May 25, 2023

Related U.S. Application Data

(60) Provisional application No. 63/283,262, filed on Nov. 25, 2021.

(51) Int. Cl.
| | |
|---|---|
| *H02J 3/00* | (2006.01) |
| *G05B 13/02* | (2006.01) |
| *G06Q 50/06* | (2012.01) |
| *H02J 3/001* | (2026.01) |

(52) U.S. Cl.
CPC .......... *H02J 3/001* (2020.01); *G05B 13/0265* (2013.01); *G06Q 50/06* (2013.01)

(58) Field of Classification Search
CPC ...... H02J 3/001; G05B 13/0265; G06Q 50/06
See application file for complete search history.

(56) References Cited

U.S. PATENT DOCUMENTS

| | | | | |
|---|---|---|---|---|
| 11,063,472 B1 * | 7/2021 | Ashrafi | .................... | G06F 17/11 |
| 2013/0338945 A1 * | 12/2013 | Feng | ................. | H02J 13/00034 |
| | | | | 702/58 |
| 2014/0229127 A1 * | 8/2014 | Ren | ......................... | H02H 3/40 |
| | | | | 324/521 |
| 2022/0299557 A1 * | 9/2022 | Yin | ........................ | G01R 27/16 |
| 2023/0136795 A1 * | 5/2023 | Ghassempour Aghamolki | .......... | |
| | | | | H02H 3/08 |
| | | | | 361/62 |

FOREIGN PATENT DOCUMENTS

CN           111680820 A  *  9/2020  ............. G06N 3/084

* cited by examiner

*Primary Examiner* — Mong-Shune Chung
(74) *Attorney, Agent, or Firm* — Borden Ladner Gervais LLP

(57) ABSTRACT

Methods and systems relating to metering and diagnostics of energy or power systems are provided. Physical measurements are often not available at various parts of an energy system, such as a power grid, for example because there is no meter present or the meter is malfunctioning. Accordingly, phantom metering is performed by estimating measurement information in the energy system. The phantom metering may be based on topology information of the energy system or grid. The energy system is then diagnosed based on the phantom metering information to identify a condition of interest, such as a condition posing danger in the system, a malfunctioning device in the system, an anomaly condition, and so on. The energy system may then be controlled based on the identified condition of interest, for example to take preventative or corrective action.

18 Claims, 4 Drawing Sheets

100

400

Topology Processor — 402

Phantom Metering — 404

Estimated Measurements

Diagnostics — 406

Data Processing — 408

Curated Data

Database, Measurements & Data Processing — 410

Measurements

500

Processor — 502

Memory — 504

512

Input / Output — 506

Communications Subsystem — 508

Storage — 510

SYSTEM AND METHODS FOR PHANTOM DIAGNOSTIC METERING OF ENERGY SYSTEMS

CROSS-REFERENCE TO RELATED APPLICATIONS

This application claims the benefit of priority of U.S. Provisional Patent Application No. 63/283,262 filed on Nov. 25, 2022, which is incorporated herein by reference.

FIELD

The present disclosure relates generally to metering, diagnostics, and control of systems, for example power systems.

BACKGROUND

Monitoring, diagnostics, and failure detection is one of the key functions used by system operators for the management and control of various types of systems. One such type of system is an energy or power system, for example an electrical grid. Electrical grids are going through a major transformation as the penetration of renewable energies, distributed energy resources, and electric vehicles is increasing in the system, further reinforcing the need for proper monitoring and diagnostics of these resources. These resources are dominantly connected to medium/low voltage distribution systems, which are often highly unbalanced among the three phases.

From the system observability point of view, the scarcity of the installed measurement units in the system is a barrier to performing system-wide monitoring and diagnostics. State estimation is used in energy management systems to provide static estimates of the energy system states, for example line active and reactive power flows, and bus voltages. Estimates may be used for many different functions in the operation and planning in the energy system, for example power flow optimization or bad data analysis. State estimators are among the techniques currently used by operators to gain visibility into areas of the system that are not metered or mis-metered. However, the unbalanced nature of distribution systems makes estimators based on a positive sequence model generally unsuitable. Further, current estimation techniques are typically not adequate to deal with high dimensionality and unbalanced nature of these systems.

Further, similar types of issues exist in other types of systems other than energy systems and electrical grid systems.

Improvements in devices, systems, and method for providing state estimations and/or for providing system control are desired.

The above information is presented as background information only to assist with an understanding of the present disclosure. No assertion or admission is made as to whether any of the above, or anything else in the present disclosure, unless explicitly stated, might be applicable as prior art with regard to the present disclosure.

BRIEF DESCRIPTION OF THE DRAWINGS

Example embodiments of the present disclosure will now be described with reference to the attached Figures.

Figure 1:
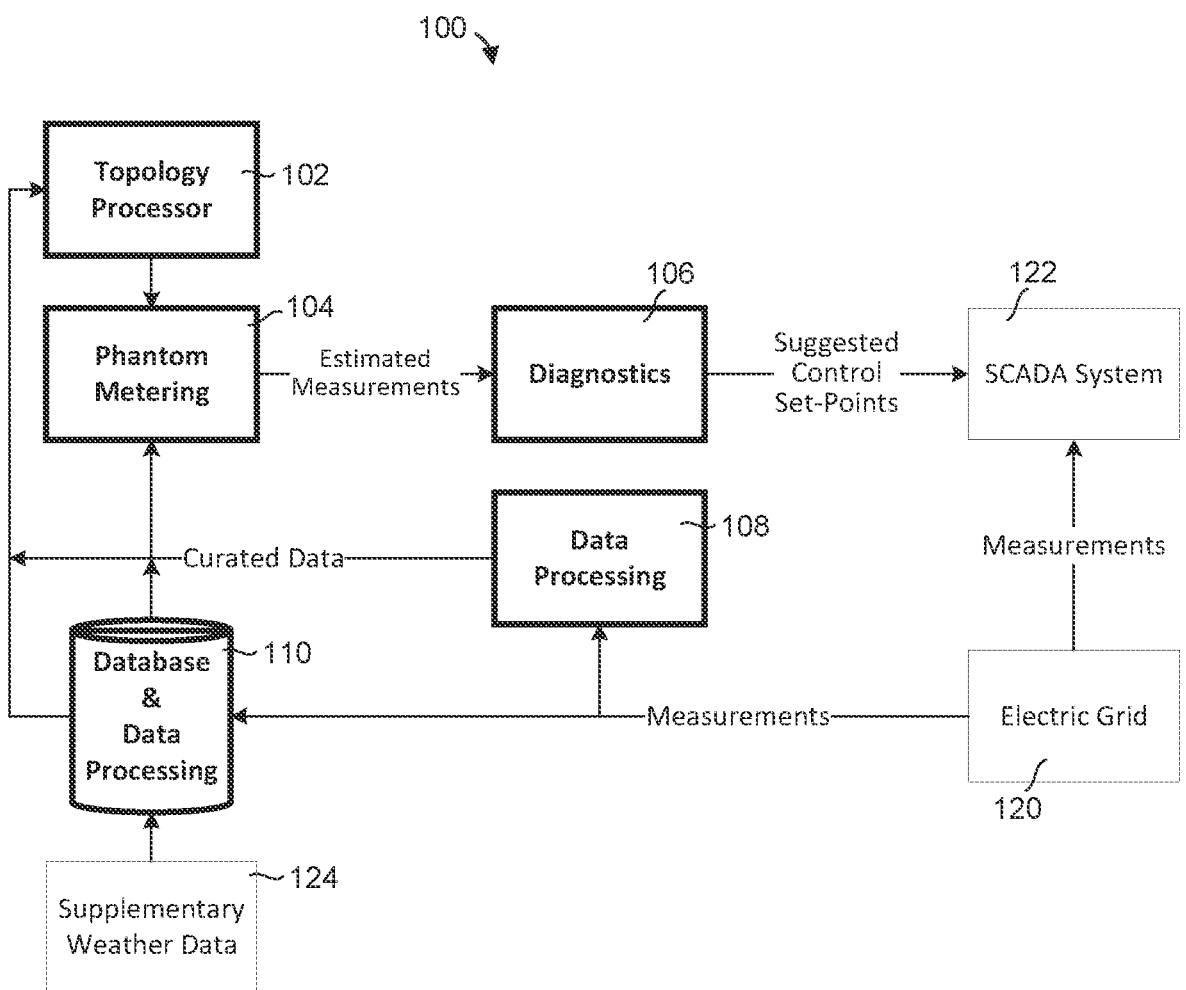
FIG. 1 is a block diagram of an example system for metering, diagnosing, and providing control to an energy system, for example an electrical grid system.

The relative sizes and relative positions of elements in the drawings are not necessarily drawn to scale. For example, the shapes of various elements and angles are not necessarily drawn to scale, and some of these elements may be arbitrarily enlarged and/or positioned to improve the readability of the drawings. Further, the particular shapes of the elements as drawn are not necessarily intended to convey any information regarding the actual shape of the particular elements, and have been solely selected for ease of recognition in the drawings.

DETAILED DESCRIPTION

In an aspect, the present disclosure is directed to a system comprising a computer-readable storage medium having executable instructions, and one or more hardware processors configured to execute the instructions for performing phantom metering by estimating measurement information in an energy system based on topology information of the energy system, diagnosing the energy system based on the estimated measurement information to identify a condition of interest in the energy system, controlling the energy system based on the identified condition of interest.

In an embodiment, the performing phantom metering involves estimating measurement information at a part of the energy system where a physical measurement is not available.

In an embodiment, before the estimating measurement information, estimating topology information of the energy system based on measurements from the energy system, wherein the topology information used in the estimating measurement information includes the estimated topology information.

In an embodiment, the performing phantom metering by estimating measurement information is further based on current and/or historical measurement data acquired from the energy system.

In an embodiment, the identified condition of interest includes a potential open conductor high-impedance fault.

In an embodiment, the controlling the energy system comprises taking preventive and/or corrective action in relation to the energy system.

In an embodiment, the performing phantom metering by estimating measurement information is performed by a data driven machine learning based phantom metering engine.

In an embodiment, the diagnosing the energy system is performed by a data driven machine learning based diagnostics engine.

In an aspect, the present disclosure is directed to a method comprising at one or more electronic devices each having one or more processors and memory performing phantom metering by estimating measurement information in an energy system based on topology information of the energy system, diagnosing the energy system based on the estimated measurement information to identify a condition of interest in the energy system, controlling the energy system based on the identified condition of interest.

In an embodiment, the performing phantom metering involves estimating measurement information at a part of the energy system where a physical measurement is not available.

In an embodiment, the method further comprises, before the estimating measurement information, estimating topology information of the energy system based on measurements from the energy system, wherein the topology information used in the estimating measurement information includes the estimated topology information.

In an embodiment, the performing phantom metering by estimating measurement information is further based on current and/or historical measurement data acquired from the energy system.

In an embodiment, the identified condition of interest includes a potential open conductor high-impedance fault.

In an embodiment, the controlling the energy system comprises taking preventive and/or corrective action in relation to the energy system.

In an embodiment, the performing phantom metering by estimating measurement information is performed by a data driven machine learning based phantom metering engine.

In an embodiment, the diagnosing the energy system is performed by a data driven machine learning based diagnostics engine.

In an aspect, the present disclosure is directed to a non-transitory computer-readable medium having computer-readable instructions stored thereon, the computer-readable instructions executable by at least one processor to cause the performance of operations comprising performing phantom metering estimating measurement information in an energy system based on topology information of the energy system, diagnosing the energy system based on the estimated measurement information to identify a condition of interest in the energy system, controlling the energy system based on the identified condition of interest.

In an embodiment, the performing phantom metering involves estimating measurement information at a part of the energy system where a physical measurement is not available.

In an embodiment, the operations further comprise, before the estimating measurement information, estimating topology information of the energy system based on measurements from the energy system, wherein the topology information used in the estimating measurement information includes the estimated topology information.

In an embodiment, wherein the performing phantom metering by estimating measurement information is further based on current and/or historical measurement data acquired from the energy system.

The present disclosure relates to improvements in metering and diagnostic technologies for systems, for example power grid and distribution systems. For example, the improvements may enhance one or more of the safety, efficiency, and reliability of power systems.

This disclosure generally relates to devices, systems, and methods that comprise advanced and intelligent techniques that are capable of leveraging the big data availability of modern systems, for example energy systems such as electrical grids, to provide metering and diagnostics of these systems.

According to an aspect, the present disclosure provides devices, apparatuses, systems, and methods related to or encompassing a data-driven state estimator based on machine learning and data analytics techniques. Furthermore, a state estimator may be used to identify or diagnose operational anomalies, for instance anomalies that may cause fire hazards, for example open-conductor high-impedance faults. In some embodiments, the state estimators may be power distribution state estimators.

According to an aspect, the present disclosure provides devices, apparatuses, systems, and methods that address some issues with conventional techniques, for example providing a system and method for hosting fast and effective data-driven predictive controllers intended for real-time operation of an energy system with scarce measurements. At least some embodiments may be suitable for energy systems having a high dimension control variables set. According to an aspect, the present disclosure provides multiple stage techniques that break down the complexity of the problem to be solved. In an embodiment, the multiple stages include phantom metering, and diagnostics. Further, in some embodiments, incremental machine learning training may be used to increase the robustness of the metering and diagnostics system to topological changes.

FIG. 1 is a block diagram of an example embodiment of a system 100 for phantom metering and for diagnosing an energy system, for example an electrical grid system. The energy system may be part of a larger energy system. Thus, an energy system may refer to a portion or subsystem of a larger energy system. Thus, in an aspect, the present disclosure is directed to phantom metering and diagnostics systems and methods. In some embodiments, a phantom metering and diagnostics system may include a topology processor. In an aspect, the present disclosure is directed to providing control in relation to an electrical grid based on output of a phantom metering and diagnostics system. Phantom metering refers to estimating measurements in the grid. Such estimations may be performed when it is not possible to obtain actual measurements, for example in parts of a grid where there are actual measurement units present or when measurement units are malfunctioning or nonfunctioning.

A supervisory control and data acquisition (SCADA) system 122 is an industrial control systems and operational infrastructure that can monitor and control a system, for example an electrical grid system. A SCADA system 122 typically allows an operator to control industrial processes locally and/or at remote locations, gather, monitor, and process real-time and other data, interact with devices such as motors, pumps, switches, valves, sensors, or meters, and record and store data, events and other information. An electrical grid system 120 may include, for example, one or more of power generating stations, renewable energy sources, power transmission systems, and power distributions systems.

The system 100 of FIG. 1 may comprise one or more of a topology processing engine (or just "topology processor") 102, a phantom metering engine 104, and a diagnostics engine 106. One or more of these may communicate with a SCADA system 122 and with an electrical grid 120. The system 100 may have database 110 and/or data processing hardware and/or software 108. These components or engines of system 100 may alternatively be referred to as a topology processor module 102, a phantom metering module 104, a diagnostics module 106, a data processing module 108, and a database module 110.

A topology processor 102 may be used for topology processing, which may be used in a state estimation process. System operators often lack specific topology information, for example distributed generators connection status. Incorrect or inaccurate system topology information can lead to incorrect state estimates, which can mislead system operators into taking detrimental system control actions. Thus, it may be beneficial for a system to correctly identify or estimate the system topology and to autonomously detect changes in topology. Topology processing generally involves a determination of the energy system (or part(s) thereof) topology, for example through available measurements connectivity data, for example of switch status indicators and possibly to link information or topology information stored in a database. The determination of topology may include estimations of the topology. Thus, topology processor 102 may comprises a topology estimator.

The topology processor 102 may take as input current and/or historical electrical grid measurement data. Further, input may include, for example, other historical and/or current information relating to the topology of the grid 120, one or more of streaming electrical grid asset data, environmental data, weather data, geographical data, and/or third party data. Weather or geographic data 124 may include for example historic and/or current data, such as weather observations and forecasts (such as temperature, humidity, wind speed, wind direction, amount of sun, amount and/or type of precipitation, cloud types, amount and/or type of cloud cover), geographic data (such as maps, topology, etc.).

Output information of the topology processor 102 may indicate or represent the topology of the grid 120.

The topology processor 102 may be any suitable topology processor, for example a conventional topology processor providing the topology and connectivity information of an electrical grid. Alternatively or additionally, the topology processor 102 may consist of or comprise a data-driven classifier for classifying the status of electricity grid switches and connected components. In an embodiment, the topology processor 102 may be a data-driven topology processor. In an embodiment, such a classifier may be based on, for example, one or more of neural networks, decision trees, or support vector machines.

The phantom metering engine 104 may be any kind of suitable engine, module, algorithm, or model. In an example embodiment, the phantom metering engine 104 may be a data-driven regressor providing estimated measurements of electricity grid for one or more parts of the grid system 120 that is not physically metered or is mis-metered (meaning not properly metered), or where physical measurement(s) are not available, for example using an ensemble of machine learning regressors. A regressor uses regression, which is a supervised learning technique. In an embodiment, an ensemble of machine learning regressors may be based on, for example, one or more of neural networks, decision trees, support vector machines, or multiple linear regression methods.

The phantom metering engine 104 may take as input the topology information from the topology processor 102 and may also include various data, for example data described above, such as input current and/or historical electrical grid measurement data, streaming electrical grid asset data, environmental data, weather data, geographical data, and/or third party data.

Output information of the phantom metering engine 104 may indicate or represent estimated measurements for the grid 120.

Information relating to estimated and/or actual grid measurements may be provided to a diagnostic engine 106, which may identify operation conditions that may be of interest to the grid operator, such as for example open conductors high-impedance faults, which may include potential or actual faults. An operation condition may be referred to more generally as a condition of interest or a predetermined condition of interest. In an embodiment, the diagnostic engine 106 may be a machine learning based engine, and thus may be trained using training data. State information of the grid system 120 may include or be based on the estimated and/or actual grid measurements. Other example types of operation conditions may include conditions that may present danger or already do present a danger, conditions relating to equipment requiring repair or maintenance, conditions relating to equipment not operating correctly or not operating at all, conditions relating to data and computer network security, for instance potential data or control breaches, or conditions signifying other potential anomalies, to name but a few. Further, diagnostic engine 106 may take as input other information and data, for example such as those described above in relation to the topology processor 102 or phantom metering engine 104. In an embodiment, a diagnostic engine 106 may be based on machine learning-based anomaly detection methods, such as neural networks or decision trees, trained to identify anomalies in the system such as high-impedance faults, open conductors, etc. Throughout the process, the actual and/or estimated grid measurements may be recorded for historical purposes. Output of the diagnostics engine 106 may be provided to a grid system controller, for example a SCADA system 122 or controller, which may control the grid system based on the diagnostics engine 106 output. A controller may take action based on this output to provide control in relation to the grid system 120. For example, the controller may take preventive and/or corrective action, for example with respect to system operation reliability and/or safety. Other actions may attempt to improve cost efficiency of the system 120, energy efficiency of the system, reduction in non-renewable energy production or use by the system, etc. The actions taken may be based on one or more objectives set or configured in the controller.

Figure 2:
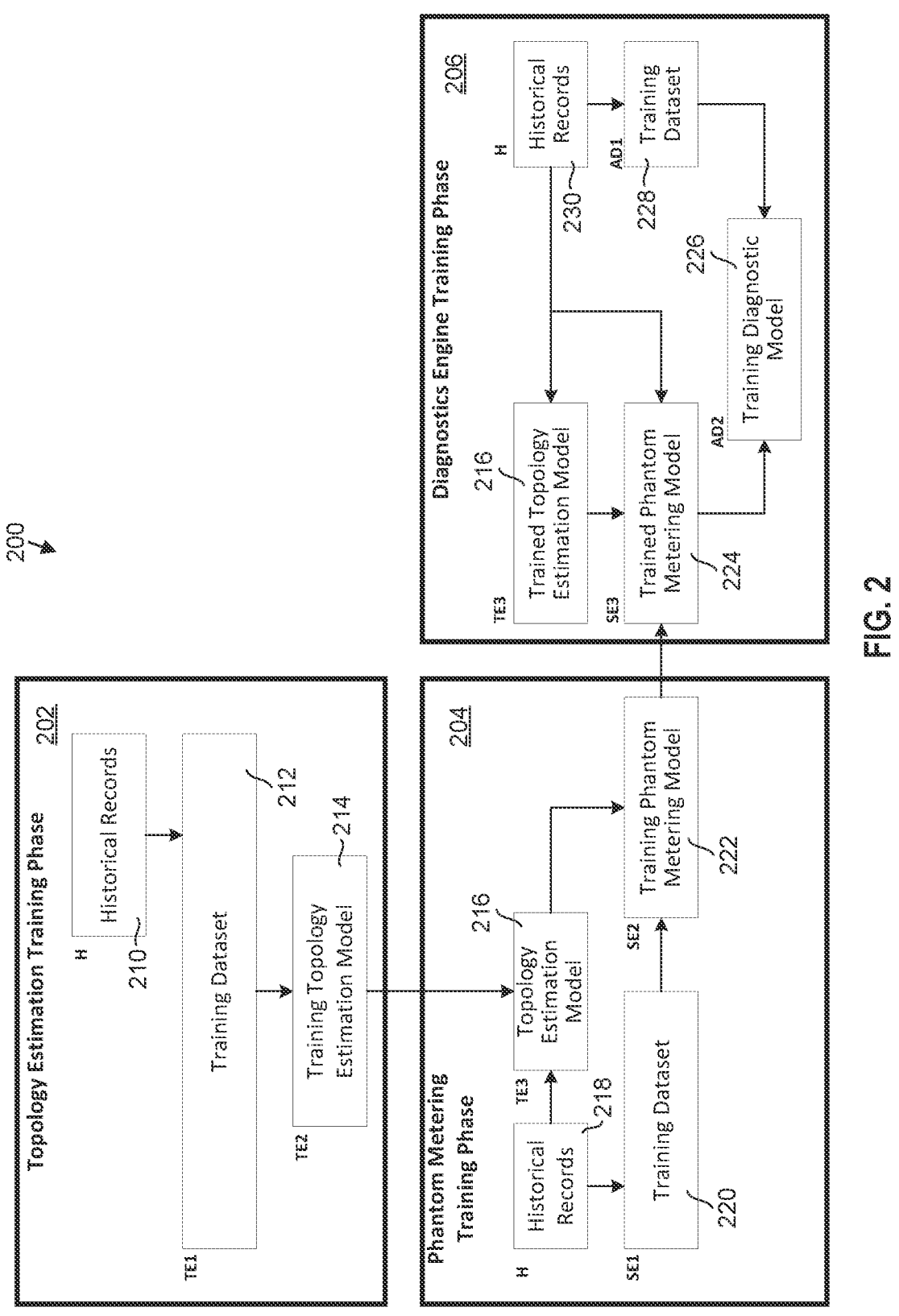
FIG. 2 is an example process flow diagram, according to an embodiment, for training a data-driven phantom metering and diagnostics system.

FIG. 2 is an example process flow diagram 200, according to an embodiment, for training a data-driven phantom metering and diagnostics system. As shown, in an embodiment, the process may include one or more of a topology estimation training phase 202, a phantom metering training phase 204, and a diagnostics engine training phase 206. However, the description of the process 200 as comprising these different phases is somewhat arbitrary and is not limiting. Training of a topology estimator of the topology processor may be performed using historical system data (H) 210 obtained from actual measurements or from a simulator. A simulator may include any suitable simulator, for example any commercial or open-source time-domain simulation platform, either on a personal computer or using servers or real-time simulators. Actual measurements may be obtained from any type of metering device in the electrical grid, such as for example power transformers (PTs), current transformers (CTs), phasor measurement units (PMUs), etc. The topology estimator may be trained using the training dataset (TE1) 212. In an embodiment, such a dataset may include historical measurement such as for example one or more of voltages and currents magnitudes and angles, active and reactive power flows, etc., alongside the historical statuses of switches in the electrical grid. The training of the topology estimator may be performed by a topology estimator training module 214. It is to be noted that in other embodiments, the topology processor may not undergo any training.

The trained topology processor model (TE3) 216 may be used in training of the phantom metering engine. Similarly, a training dataset (SE1) 220 may constructed using historical data (H) 218 and/or emulated data from the simulator. In an embodiment, the training dataset (SE1) 220 may include one or more of historical voltage and current magnitudes and angles, active and reactive power flows, switches status and system topology, etc. The training of the phantom metering engine may be performed using a phantom metering training module 222. Furthermore, the trained topology estimator (TE3) 216 may be used by a simulator to produce supplementary training data for the phantom metering training process.

The trained phantom metering model (SE3) 224, and optionally a trained topology estimation model (TE3) 216 may be used in training the diagnostic engine. The training of the diagnostics engine may be performed using a diagnostics engine training module 226. A training dataset (AD1) 228 may be constructed using historical data (H) 230 and/or emulated data from the simulator. In an embodiment, this dataset may include one or more of historical voltage and current magnitudes and angles, active and reactive power flows, switches status and system topology, failure and anomalies flags, etc. The trained topology estimation model (TE3) 216 and/or the trained phantom metering model (SE3) 224 may be used in the same emulation scenarios to construct supplementary data for the training phase of the diagnostics engine (AD2) 226.

Figure 3:
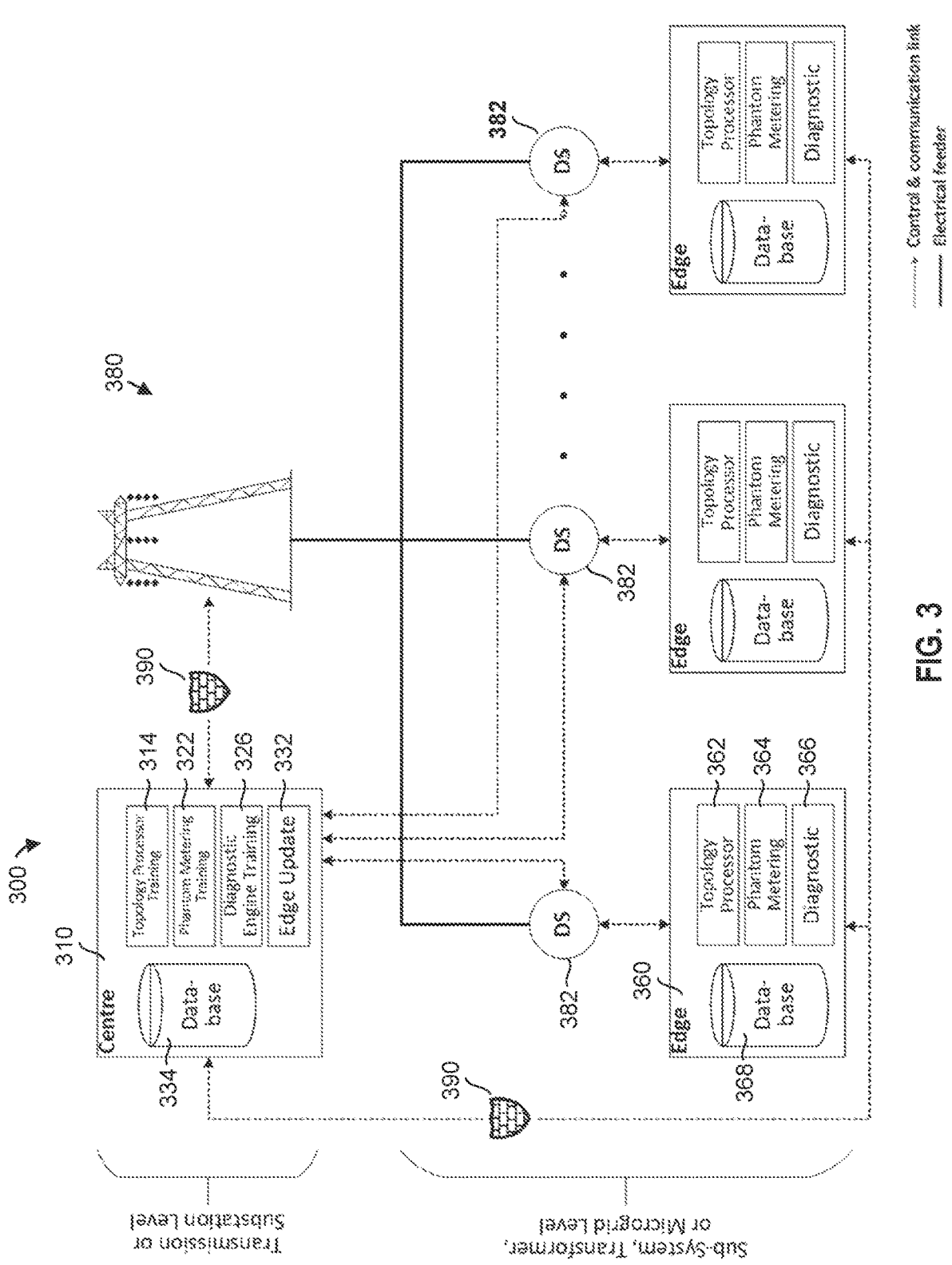
FIG. 3 is a block diagram of an example phantom metering and diagnostics system in operation with an electrical grid.

FIG. 3 is a block diagram of an example phantom metering and diagnostics system 300 in operation with an electrical grid 380. In this non-limiting example embodiment, phantom metering and diagnostics system 300 may generally comprise a center module or subsystem 310, and one or more edge modules or subsystems 360, which cooperate to providing phantom metering and diagnostics in relation to the electrical grid 380. Grid 380 may comprise one or more down stream components 382 of electrical grid 380, for example a grid sub-system, a transformer, or a micro grid level. As shown in the legend in FIG. 3, the solid connecting lines represent possible electrical power connection or feeder lines or links, whereas the dashed connecting lines represent possible communication lines or links, for example for communicating control and/or other information.

The term 'module' will be used for simplicity but without limitation. Furthermore, the subdivision of the phantom metering and diagnostics system 300 into a center module 310 and one or more edge modules 360 is optional and is thus merely an example. Therefore, in other embodiments, phantom metering and diagnostics system 300 may be subdivided in any other suitable way or may not be subdivided at all.

In an embodiment, a center module 310 may be provided at a transmission or substation level in the electrical grid 380, while the one or more edge modules 360 may be provided at the grid sub-system, transformer, or micro grid level. The shown firewalls 390 are optional.

Center module 310 may comprise one or more of a topology estimator training module 314, a phantom metering training module 322, a diagnostics engine training module 326, an edge update module 332, and a database module 334. Thus, the training of one or more of a topology estimator, a phantom metering module, and a diagnostics engine may be performed at or by center module 310. Edge update module 332 may be configured to provide one or more of the trained topology estimator, phantom metering module, and a diagnostics engine to one or more edge modules 360.

Edge module 360 may comprise one or more of a topology processor 362, a phantom metering engine 364, a diagnostics engine 366, and a database module 368. These may correspond to one or more of topology processor 102, phantom metering engine 104, diagnostics engine 106, and database 110, respectively, of FIG. 1.

Figure 4:
FIG. 4 is a block diagram showing some possible features in an example edge module or subsystem in FIG. 3, according to an embodiment.
Figure 4:
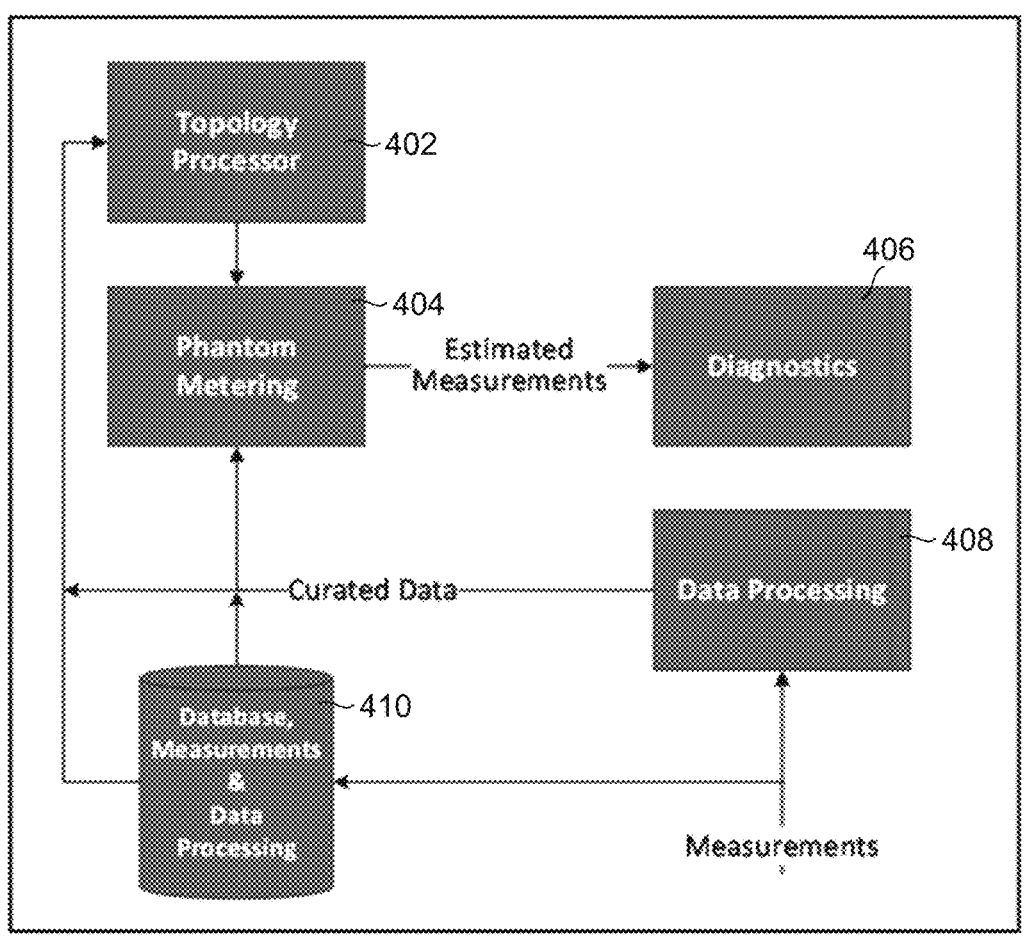

FIG. 4 is a block diagram showing a system or subsystem 400 having some possible features in phantom metering and diagnostics system 300, which in an example may be part of an edge module in FIG. 3, according to an embodiment. These example features or modules may be the same or similar to some of those previously described in relation to FIG. 1. Thus, subsystem 400 may comprise one or more of a topology processing engine (or just "topology processor") 402, a phantom metering engine 404, and a diagnostics engine 406. One or more of these may communicate with a SCADA system and/or with an electrical grid. System 400 may have database 410 and/or data processing hardware and/or software 408. Topology processor 402, phantom metering engine 404, and diagnostics engine 406 may correspond to one or more of topology processor 362, phantom metering engine 364, and diagnostics engine 366, respectively, shown in FIG. 3.

Referring to FIGS. 3 and 4, grid measurements may be provided to the edge modules 360. In an embodiment, these measurements may be, for example, one or more of switches statuses, voltages and/or currents magnitudes and/or angles, active and reactive power flows, system failure flags, etc. Measurement information may be stored at edge modules 360, for example in a database. Further, measurements may be curated by a data processing unit, for example data processing module 408 in FIG. 4. In an embodiment, the data processing may treat missing data values, outliers, etc., and/or may perform statistical functions such as averaging, normalizing, etc. Recent measurements and possibly other supplementary historical measurements may be provided to a topology processor 362.

The output of topology processor 362, and possibly recent and/or historical measurements, may be provided to phantom metering engine 364. The output of the phantom metering engine 364, which may comprise estimated and/or actual measurements from the grid system 380, or down stream component 382, may be provided to the diagnostics engine 366. Output of the diagnostics engine 366 may be provided to a grid system controller, for example a SCADA system or controller. The controller may comprise an operational optimization engine, for example at a SCADA system or controller, aimed at solving an objective function relevant to the grid or system operator for providing control to the system. Providing control to the grid system 380 may include controlling various assets or devices in the system 380. Output of the diagnostics engine 366 may include information relating to identified operation conditions of the grid system 380. As a mere example, the output may include information identifying a potential or actual open-conductor high-impedance fault in the grid system. The objective function may pursue operational objectives, such as keeping voltage, current and system losses within acceptable boundaries in real time. The optimization engine may generate commands for the system 380, for example to action dispatchable assets, such as storage systems or generators.

The center module 310 may perform one or more of receiving and storing system-wide measurements, and re-training and updating data-driven engines, such as a topology estimation engine, a phantom metering engine, and/or diagnostic engine. In an embodiment not having a center module, the functions described above and any others may be performed at an edge module(s). Furthermore, and more generally, as previously described, in some embodiments, phantom metering and diagnostics system may not be subdivided into center and edge modules.

In one or embodiments, centre and/or edge modules may be hosted in the cloud, or be physical machines no in the cloud, and may each include a CPU, RAM, and physical memory. Communication between system components can be based on any protocols, such as IEC 61850, TCP/IP, MQQT, etc.

In an embodiment, the phantom metering and/or diagnostics may be performed in real time or near real time.

While at least some of the teachings, embodiments, and examples described herein refer to electrical grids, it is to be appreciated that the present techniques may be used in conjunction with any suitable types of systems. Therefore, the teachings according to the present application apply to systems other than energy systems such as electrical grids. Thus, references herein to electrical grids are meant as examples only and are not meant to be limiting. Other mere example types of systems include but are not limited to transportation distribution networks, for example vehicle fleets, aviation, trains, or ships, water distribution systems, wastewater collection and/or treatment systems, water treatment systems, manufacturing systems, oil or gas refinement systems, oil or gas distributions systems, buildings or other infrastructure systems, to name but a few.

The term module used herein may refer to a software module, a hardware module, or a module comprising both software and hardware. Generally, software includes computer executable instructions, and possibly also data, and hardware refers to physical computer hardware. Further, the term engine generally refers to a component of a software system, but may also include computer hardware configured to run the software component.

Embodiments and operations according to the present disclosure may be implemented in digital electronic circuitry, and/or in computer software, firmware, and/or hardware, including structures according to this disclosure and their structural equivalents. Embodiments and operations according to the present disclosure may be implemented as one or more computer programs, for example one or more modules of computer program instructions, stored on or in computer storage media for execution by, or to control the operation of, one or more computer processing devices such as a processor. Operations according to the present disclosure may be implemented as operations performed by one or more processing devices on data stored on one or more computer-readable storage devices or media, and/or received from other sources.

In some embodiments, algorithms, techniques, and/or approaches according to the present disclosure may be performed or based on artificial intelligence (AI) algorithms, techniques, and/or approaches.

In some embodiments, the AI algorithms and techniques may include machine learning techniques.

Machine Learning (ML) may be used in power or energy systems, including phantom metering and diagnostics systems, with penetration of renewable energy such as wind, solar, or tidal energy, to improve the utilization of variable renewable resources and coordinate consumption/demand. Machine learning models may be used, as a mere example, to predict future resource availability and demand requirements, and/or control assets in a system, for instance using one or more optimizations. Predictions may be used for scheduling purposes, for example energy generation, storage, and/or pricing to optimally coordinate these energy systems to achieve various objectives such as cost minimization, efficiency maximization, or optimal use of local renewable energy. Further, predictors and/or optimizers, and the training thereof, may also be based on machine learning techniques.

A machine learning algorithm or system may receive data, for example historical data, streaming asset data, meter or sensor data, environmental data, and/or third party data, and, using one or more suitable machine learning algorithms, may generate one or more machine learning datasets. Example types of machine learning algorithms include but are not limited to supervised learning algorithms, unsupervised learning algorithms, regression algorithms (for example logistic regression, linear regression, and so forth), regularization algorithms (for example least-angle regression, ridge regression, and so forth), artificial neural network algorithms, instance based algorithms (for example locally weighted learning, learning vector quantization, and so forth), Bayesian algorithms, decision tree algorithms, clustering algorithms, and so forth. Further, other machine learning algorithms may be used additionally or alternatively. In some embodiments, a machine learning algorithm or system may analyze data to identify patterns and/or sequences of activity, and so forth, to generate one or more machine learning datasets.

A control system may comprise one or more control policies. The control policies of the system may be based on trained machine learning systems. In this sense, a control policy may be part of a control agent. A control agent observes its environment, herein referred to a control environment, and takes action based on its observations, or percepts, of the control environment. The taking of action is referred to as controlling the system. Depending on the state of the environment, taking action may involve taking no action at all, for example if there has been little or no change in the state since the last time the agent took action. Thus, doing nothing is a valid action in a set of actions in the action space of the controller. The present systems and methods may exploit the flexibility of controllable assets in the power system to achieve improved performance of the system. For example, the flexibility of controllable assets may be exploited in response to changes in the control environment.

In an embodiment, online machine learning may be employed. Online machine learning is a technique of machine learning where data becomes available sequentially over time. The data is utilized to update a predictor for future data at each step in time (e.g. time slot). This approach of online machine learning may be contrasted to approaches that use batch learning wherein learning performed on an entire training data set. Online machine learning is sometimes useful where the data varies significantly over time, such as in power or energy pricing, commodity pricing, and stock markets. Further, online machine learning may be helpful when it is not practical or possible to train the agent over the entire data set.

In embodiments according to the present disclosure, optimizer training may be based on online reinforcement learning and/or off-line reinforcement learning.

Figure 5:
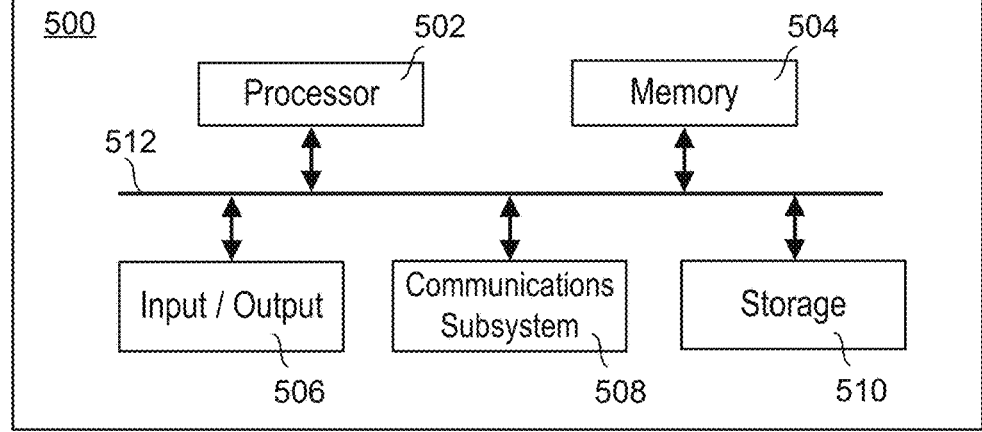
FIG. 5 is a block diagram of an example computerized device or system.

FIG. 5 is a block diagram of an example computerized device or system 500 that may be used in implementing one or more aspects or components of an embodiment according to the present disclosure. For example, system 500 may be used to implement a computing device or system, such as a phantom metering and diagnostics system, for example system 100, 300, or part thereof, to be used with a device, system or method according to the present disclosure. Thus, one or more systems 500 may be configured to implement one or more portions of the systems described herein. This includes center module and/or edge module(s).

Computerized system 500 may include one or more of a computer processor 502, memory 504, a mass storage device 510, an input/output (I/O) interface 506, and a communications subsystem 508. A computer processor device may be any suitable device(s), and encompasses various devices, systems, and apparatus for processing data and instructions. These include, as examples only, one or more of a hardware processor, programmable processor, a computer, a system on a chip, and special purpose logic circuitry such as an ASIC (application-specific integrated circuit) and/or FPGA (field programmable gate array).

Memory 504 may be configured to store computer readable instructions, that when executed by processor 502, cause the performance of operations, including operations in accordance with the present disclosure.

One or more of the components or subsystems of computerized system 500 may be interconnected by way of one or more buses 512 or in any other suitable manner.

The bus 512 may be one or more of any type of several bus architectures including a memory bus, storage bus, memory controller bus, peripheral bus, or the like. The CPU 502 may comprise any type of electronic data processor. The memory 504 may comprise any type of system memory such as dynamic random access memory (DRAM), static random access memory (SRAM), synchronous DRAM (SDRAM), read-only memory (ROM), a combination thereof, or the like. In an embodiment, the memory may include ROM for use at boot-up, and DRAM for program and data storage for use while executing programs.

The mass storage device 510 may comprise any type of storage device configured to store data, programs, and other information and to make the data, programs, and other information accessible via the bus 512. In particular, device 510 may be configured to implement and/or store one or more of databases 110, 334, 368, 410. The mass storage device 510 may comprise one or more of a solid-state drive, hard disk drive, a magnetic disk drive, an optical disk drive, or the like. In some embodiments, data, programs, or other information may be stored remotely, for example in the cloud. Computerized system 500 may send or receive information to the remote storage in any suitable way, including via communications subsystem 508 over a network or other data communication medium.

The I/O interface 506 may provide interfaces for enabling wired and/or wireless communications between computerized system 500 and one or more other devices or systems, such as an industrial system, for example an electrical grid, according to the present disclosure. Furthermore, additional or fewer interfaces may be utilized. For example, one or more serial interfaces such as Universal Serial Bus (USB) (not shown) may be provided. Further, system 500 may comprise or be communicatively connectable to a display device, and/or speaker device, a microphone device, an input device such as a keyboard, pointer, mouse, touch screen display or any other type of input device. Further, system 500 may be communicatively coupled to various devices in an industrial system, such as meters, sensors, switches, motors, pumps, battery storage systems, energy storage systems, renewable power sources, non-renewable power sources, to name but a few.

Computerized system 500 may be used to configure, operate, control, monitor, sense, and/or adjust devices, systems, and/or methods according to the present disclosure.

A communications subsystem 508 may be provided for one or both of transmitting and receiving signals over any form or medium of digital data communication, including a communication network. Examples of communication networks include a local area network (LAN), a wide area network (WAN), an inter-network such as the Internet, and peer-to-peer networks such as ad hoc peer-to-peer networks. Communications subsystem 508 may include any component or collection of components for enabling communications over one or more wired and wireless interfaces. These interfaces may include but are not limited to USB, Ethernet (e.g. IEEE 802.3), high-definition multimedia interface (HDMI), Firewire™ (e.g. IEEE 1374), Thunderbolt™, WiFi™ (e.g. IEEE 802.11), WiMAX (e.g. IEEE 802.16), Bluetooth™, or Near-field communications (NFC), as well as GPRS, UMTS, LTE, LTE-A, and dedicated short range communication (DSRC). Communication subsystem 508 may include one or more ports or other components (not shown) for one or more wired connections. Additionally or alternatively, communication subsystem 508 may include one or more transmitters, receivers, and/or antenna. Further, computerized system 500 may comprise client and server elements (none of which are shown).

Computerized system 500 of FIG. 5 is merely an example and is not meant to be limiting. Various embodiments may utilize some or all of the components shown or described. Some embodiments may use other components not shown or described but known to persons skilled in the art.

Logical operations of the various embodiments according to the present disclosure may be implemented as (i) a sequence of computer implemented steps, procedures, or operations running on a programmable circuit in a computer, (ii) a sequence of computer implemented operations, procedures, or steps running on a specific-use programmable circuit; and/or (iii) interconnected machine modules or program engines within the programmable circuits. The computerized device or system 500 of FIG. 5 may practice all or part of the recited methods or operations, may be a part of systems according to the present disclosure, and/or may operate according to instructions in computer-readable storage media. Such logical operations may be implemented as modules configured to control a computer processor, such as processor 502, to perform particular functions according to the programming of the module. In other words, a computer processor, such as processor 502, may execute the instructions, steps, or operations according to the present disclosure, including of the one or more of the blocks or modules. For example, one or more of the modules or blocks in FIGS. 1-4 may be configured to control processor 502. At least some or part(s) of these blocks or modules may be stored on storage device 510 and loaded into memory 504 at runtime or may be stored in other computer-readable memory locations.

The concept of "near real-time" may be defined as operating using a pre-determined time interval or less, usually a relatively short time. A time interval for real-time is generally shorter than an interval for near real-time. Mere non-limiting examples of predetermined time intervals for real time or near real time may include the following as well as values below, between, and/or above these figures: 10 s, 60 s, 5 min, 10 min, 20 min, 30 min, 60 min, 2 hr, 4 hr, 6 hr, 8 hr, 10 hr, 12 hr, 1 day.

A center module and edge module(s) may be implemented on separate computing devices, on a single computing device, or on several computing devices. In an embodiment, a center module and edge module(s) may be implemented in a distributed computing system wherein operations are performed at each of two or more computing devices. Other options and configurations are possible.

Some or all of center module, edge modules, and other modules may be implemented, for example, on or using one or more electronic or other computer processors, computer memories, computer storage devices for storing one or more databases, as well as other computer hardware. Some or all of the modules may be software modules, and/or may comprise both computer software and hardware. Further, in at least some embodiments, systems and devices are described as comprising one or more modules solely for ease of explanation. These systems and devices are not necessarily subdivided according to the one or more modules. Accordingly, descriptions herein of these systems and devices as having one or more modules is not meant to be limiting in any way.

In other embodiments, the functions, operations, and/or structures of center module and edge module(s) not be divided as shown in the figures and described herein. For example, some or all of the functions, operations, and/or structures of edge module(s) may be located or performed at a center module. Alternatively, some or all of the functions, operations, and/or structures of a center module may be located or performed at edge module(s). Alternatively, the system could have only a single module or subsystem, which has all of the functions, operations, and/or structures of both center and edge modules described herein. Other configurations are also possible and contemplated.

Similarly, in other embodiments, the functions, operations, and/or structures of the various modules and subsystems may not necessarily be divided as shown and/or described herein. Rather, the functions, operations, and/or structures may be organized in any other suitable manner, including in one or more other modules and/or subsystems, and/or without any modules and/or subsystems.

Further, data or other information paths and signals, including those described herein and shown in the figures, may be different in other embodiments. For example, information and/or signal paths such as those represented by lines and/or arrows in FIGS. 1-4, may be communicated to or from parts or components other than those indicated by the lines and/or arrows in those figures.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not necessarily provided as to whether the embodiments described herein are implemented as a computer software, computer hardware, electronic hardware, or a combination thereof.

In at least some embodiments, one or more aspects or components may be implemented by one or more special-purpose computing devices. The special-purpose computing devices may be any suitable type of computing device, including desktop computers, portable computers, handheld computing devices, networking devices, or any other computing device that comprises hardwired and/or program logic to implement operations and features according to the present disclosure.

Embodiments of the disclosure may be represented as a computer program product stored in a machine-readable medium (also referred to as a computer-readable medium, a processor-readable medium, or a computer usable medium having a computer-readable program code embodied therein). The machine-readable medium may be any suitable tangible, non-transitory medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations may also be stored on the machine-readable medium. The instructions stored on the machine-readable medium may be executed by a processor or other suitable processing device, and may interface with circuitry to perform the described tasks.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

In addition, the steps and the ordering of the steps of methods and data flows described and/or illustrated herein are not meant to be limiting. Methods and data flows comprising different steps, different number of steps, and/or different ordering of steps are also contemplated. Furthermore, although some steps are shown as being performed consecutively or concurrently, in other embodiments these steps may be performed concurrently or consecutively, respectively.

For simplicity and clarity of illustration, reference numerals may have been repeated among the figures to indicate corresponding or analogous elements. Numerous details have been set forth to provide an understanding of the embodiments described herein. The embodiments may be practiced without these details. In other instances, well-known methods, procedures, and components have not been described in detail to avoid obscuring the embodiments described.

The embodiments according to the present disclosure are intended to be examples only. Alterations, modifications and variations may be effected to the particular embodiments by those of skill in the art without departing from the scope, which is defined solely by the claims appended hereto.

The terms "a" or "an" are generally used to mean one or more than one. Furthermore, the term "or" is used in a non-exclusive manner, meaning that "A or B" includes "A but not B," "B but not A," and "both A and B" unless otherwise indicated. In addition, the terms "first," "second," and "third," and so on, are used only as labels for descriptive purposes, and are not intended to impose numerical requirements or any specific ordering on their objects.

The invention claimed is:

1. A system comprising:

a non-transitory computer-readable storage medium having executable instructions; and one or more hardware processors configured to execute the instructions for:

performing phantom metering by estimating measurement information in an energy system using topology information of the energy system, wherein the performing phantom metering involves estimating measurement information at a part of the energy system where a physical measurement is not available;

diagnosing the energy system based on the estimated measurement information to identify a condition of interest in the energy system;

controlling the energy system based on the identified condition of interest.

2. The system of claim 1, further comprising, before the estimating measurement information, estimating topology information of the energy system based on measurements from the energy system, wherein the topology information used in the estimating measurement information includes the estimated topology information.

3. The system of claim 1, wherein the performing phantom metering by estimating measurement information is further based on current and/or historical measurement data acquired from the energy system.

4. The system of claim 1, wherein the identified condition of interest includes a potential open conductor high-impedance fault.

5. The system of claim 1, wherein the controlling the energy system comprises taking preventive and/or corrective action in relation to the energy system.

6. The system of claim 1, wherein the performing phantom metering by estimating measurement information is performed by a data driven machine learning based phantom metering engine.

7. The system of claim 1, wherein the diagnosing the energy system is performed by a data driven machine learning based diagnostics engine.

8. A method comprising:

at one or more electronic devices each having one or more processors and memory:

performing phantom metering by estimating measurement information in an energy system using topology information of the energy system, wherein the performing phantom metering involves estimating measurement information at a part of the energy system where a physical measurement is not available;

diagnosing the energy system based on the estimated measurement information to identify a condition of interest in the energy system;

controlling the energy system based on the identified condition of interest.

9. The method of claim 8, further comprising, before the estimating measurement information, estimating topology information of the energy system based on measurements from the energy system, wherein the topology information used in the estimating measurement information includes the estimated topology information.

10. The method of claim 8, wherein the performing phantom metering by estimating measurement information is further based on current and/or historical measurement data acquired from the energy system.

11. The method of claim 8, wherein the identified condition of interest includes a potential open conductor high-impedance fault.

12. The method of claim 8, wherein the controlling the energy system comprises taking preventive and/or corrective action in relation to the energy system.

13. The method of claim 8, wherein the performing phantom metering by estimating measurement information is performed by a data driven machine learning based phantom metering engine.

14. The method of claim 8, wherein the diagnosing the energy system is performed by a data driven machine learning based diagnostics engine.

15. A non-transitory computer-readable medium having computer-readable instructions stored thereon, the computer-readable instructions executable by at least one processor to cause the performance of operations comprising:

performing phantom metering estimating measurement information in an energy system using topology information of the energy system, wherein the performing phantom metering involves estimating measurement information at a part of the energy system where a physical measurement is not available;

diagnosing the energy system based on the estimated measurement information to identify a condition of interest in the energy system;

controlling the energy system based on the identified condition of interest.

16. The non-transitory computer-readable medium of claim 15, wherein the controlling the energy system comprises taking preventive and/or corrective action in relation to the energy system.

17. The non-transitory computer-readable medium of claim 15, wherein the operations further comprise, before the estimating measurement information, estimating topology information of the energy system based on measurements from the energy system, wherein the topology information used in the estimating measurement information includes the estimated topology information.

18. The non-transitory computer-readable medium of claim 15, wherein the performing phantom metering by estimating measurement information is further based on current and/or historical measurement data acquired from the energy system.

* * * * *